US012790456B2

(12) United States Patent
Richter

(10) Patent No.: US 12,790,456 B2
(45) Date of Patent: Nov. 10, 2026

(54) COMPOSITIONS AND METHODS FOR THE RECYCLING OF A MIXED PLASTIC FEEDSTOCK

(71) Applicant: Tina Richter, Ontario, CA (US)

(72) Inventor: Tina Richter, Ontario, CA (US)

( * ) Notice: Subject to any disclaimer, the term of this patent is extended or adjusted under 35 U.S.C. 154(b) by 858 days.

(21) Appl. No.: 17/819,606

(22) Filed: Aug. 12, 2022

(65) Prior Publication Data

US 2023/0066052 A1 Mar. 2, 2023

Related U.S. Application Data

(60) Provisional application No. 63/232,584, filed on Aug. 12, 2021.

(51) Int. Cl.

| | |
|---|---|
| ***C08J 11/16*** | (2006.01) |
| ***B29B 13/02*** | (2006.01) |
| ***B29B 13/06*** | (2006.01) |
| ***B29B 13/10*** | (2006.01) |
| ***B29B 17/04*** | (2006.01) |
| *C08K 3/34* | (2006.01) |

(52) U.S. Cl.

CPC ............ *C08J 11/16* (2013.01); *B29B 13/022* (2013.01); *B29B 13/06* (2013.01); *B29B 13/10* (2013.01); *B29B 17/04* (2013.01); *B29B 2017/042* (2013.01); *C08J 2300/30* (2013.01); *C08K 3/346* (2013.01); *Y02W 30/62* (2015.05)

(58) Field of Classification Search

CPC .... B29B 17/04–0412; B29B 2017/042; B29B 13/022; B29B 13/06; B29B 13/10; B29B 2017/0484; B29B 2017/0015; B29B 17/0026; B09B 3/40; C08K 3/346; C08J 11/16; C08J 2300/30; C08J 2300/22; Y02W 30/62

See application file for complete search history.

(56) References Cited

U.S. PATENT DOCUMENTS 5,335,786 A * 8/1994 Roberto .................. B29B 13/10 209/636
6,274,637 B1 8/2001 Schallenberg
(Continued)

FOREIGN PATENT DOCUMENTS

CN 101041725 B 5/2012
EP 3705197 A1 9/2020
(Continued)

OTHER PUBLICATIONS

Machine translation of EP 0334420 by Bertolino. (Year: 1989).*
(Continued)

*Primary Examiner* — Christina H. W. Rosebach
(74) *Attorney, Agent, or Firm* — KPPB LLP

(57) ABSTRACT

Compositions and processes for the tertiary recycling of mixed plastic waste into a stable and homogeneous plastic feedstock material are provided. The processes and compositions allow for the tertiary recycling of unsorted, unwashed and unidentified mixed plastic waste, including waste mixtures comprising polymer macromolecules with different molecular weights and polymer chain lengths. The processes include the blending of a mixed plastic waste feedstock with a recycling composition and virgin carrier materials comprising at least one alluvium material.

12 Claims, 2 Drawing Sheets

(56) References Cited

U.S. PATENT DOCUMENTS

| | | | |
|---|---|---|---|
| 8,450,382 | B2 | 5/2013 | Riise et al. |
| 10,301,448 | B2 | 5/2019 | Valdmaa et al. |
| 2007/0149625 | A1 | 6/2007 | Lark et al. |
| 2010/0080738 | A1 | 4/2010 | Carner |
| 2016/0355663 | A1 | 12/2016 | Valdmaa et al. |
| 2019/0390034 | A1 | 12/2019 | Layman et al. |
| 2021/0122898 | A1 | 4/2021 | Luthe et al. |

FOREIGN PATENT DOCUMENTS

| | | | | | |
|---|---|---|---|---|---|
| EP | 4384570 | A1 | | 6/2024 | |
| IN | 202417020396 | A | | 11/2024 | |
| JP | 5670812 | B2 | | 12/2014 | |
| KR | 102384851 | B1 | | 4/2022 | |
| WO | 1996011973 | A1 | | 4/1996 | |
| WO | WO-2019197984 | A1 | * | 10/2019 | ............... E04B 1/12 |
| WO | 2020201084 | A1 | | 10/2020 | |
| WO | 2023019271 | A1 | | 2/2023 | |

OTHER PUBLICATIONS

Machine translation of FR 2563212 by Vitry. (Year: 1985).*

Larranaga, M.D., Lewis, R.J., Sr. and Lewis, R.A. (2016). S. In Hawley's Condensed Chemical Dictionary, Sixteenth Edition. (Year: 2016).*

Wolf, R. et al. "Plastics, Additives" in Ullmann's Encyclopedia of Industrial Chemistry. Wiley-VCH Verlag Gmbh & Co. KGaA. pp . 619-671 (Year: 2012).*

Mertes, A. "Types of Plastic and Their Recycle Codes". Published Jun. 14, 19. Accessed at: https://dpw.lacounty.gov/epd/SBR/pdfs/TypesOfPlastic.pdf (Year: 2019).*

Patil, G.N. et al. Manufacturing of plastic sand bricks from polypropylene and polyethylene waste plastic. International Journal of Advanced Science and Technology. Vol 29, No. 8, pp. 2062-2068 (Year: 2020).*

International Preliminary Report on Patentability for International Application PCT/US2022/074943, Report issued Feb. 13, 2024, Mailed on Feb. 22, 2024, 08 Pgs.

International Search Report and Written Opinion for International Application No. PCT/US2022/074943, Search completed Oct. 26, 2022, Mailed Nov. 25, 2022, 15 Pgs.

Dorigato, "Recycling of polymer blends", Advanced Industrial Engineering Polymer Research, Apr. 2021, vol. 4, No. 2, pp. 53-69, DOI: 10.1016/j.aiepr.2021.02.005.

Huyhua, "Recycling Plastics: New Recycling Technology and Biodegradable Polymer Material", Illumin Magazine, Apr. 28, 2023, 7 pgs.

Lathela et al., "Composition of Plastic Fractions in Waste Streams: Toward More Efficient Recycling and Utilization", Polymers, Jan. 5, 2019, vol. 11, No. 1, pp. 69-76, DOI: 10.3390/polym11010069.

Extended European Search Report for European Application No. 22856853.1, Search completed Sep. 22, 2025, Mailed Oct. 7, 2025, 65 Pgs.

* cited by examiner

COMPOSITIONS AND METHODS FOR THE RECYCLING OF A MIXED PLASTIC FEEDSTOCK

CROSS-REFERENCE TO RELATED APPLICATIONS

The current application claims the benefit, under 35 U.S.C. § 119(e), of U.S. Provisional Patent Application No. 63/232,584 entitled "Compositions and Methods for the Recycling of a Mixed Plastic Feedstock" filed Aug. 12, 2021. The disclosure of U.S. Provisional Patent Application No. 63/232,584 is hereby incorporated by reference in its entirety for all purposes.

TECHNICAL FIELD

The current disclosure relates generally to compositions and methods for recycling plastic waste, and more specifically to compositions and methods for the recycling of unsorted mixed plastic waste into new feedstock materials.

BACKGROUND OF THE INVENTION

For the past several decades plastics have been an indispensable ingredient in modern society. They are integral in a wide variety of household and commercial products, such as bags, water bottles, food containers, packaging materials, and disposable utensils. While these plastic materials are convenient and inexpensive, their disposal poses a number of significant challenges. First, they are the fastest growing portion (by volume) of waste material discarded into landfills, and have been since the 1960s. What is more, beyond the space they occupy, plastics have a low rate of biodegradability compared to other classes of waste and also release a barrage of toxic chemicals into the environment as they do degrade. Toxic chemicals that are derived from plastics (for example, phthalates) have been found to be endemic in ground water due to leachate infiltration.

Plastics are usually disposed of in one of three ways: discarded, combusted, or recycled. Of the three options, only recycling allows for the creation of a truly sustainable plastics lifecycle. Unfortunately, establishing a viable recycling infrastructure has been problematic because current recycling systems require labor-intensive sorting which contributes to enormous inefficiency and a low overall recycling rates. (See, e.g., Huyhua, *Illumin Magazine*, (Jun. 28, 2021), the disclosure of which is incorporated herein by reference.) Technology that eliminates the sorting process could potentially increase recycling rates, but thus far has been restricted to either complex engineering solutions, such as selective dissolution, or solutions that require the engineering of entirely new plastic materials, such as biodegradable polymers. As a result, economically and commercially viable solutions to the plastic waster problem have been elusive.

SUMMARY OF THE INVENTION

Many embodiments are directed to a composition for recycling of mixed plastic waste including an effective amount of an alluvium material.

In many other embodiments the composition may further include one or more of the following materials pigments, synergists, UV protective agents, antioxidants, foaming agents, glass fiber substances and/or textile fiber substances, and carriers.

In still many other embodiments the composition may include the following materials and approximate concentrations: aromatic bromine, tri antimony oxide, sodium bicarbonate, sodium chloride, alluvium, fiberglass, and a carrier.

In still many other embodiments the composition may include the following materials: ethanol, cera alba, grains, glycerin, citric acid, sulfate and diatomaceous earth or kieselguhr.

In still many other embodiments the carrier may include one or more of low density polyethylene, polystyrene, polypropylene, polyethylene terephthalate, acrylonitrile-butadiene-styrene, polyetherimide.

In yet many other embodiments the composition may be used to recycle mixed plastic waste comprising plastic waste of different types.

In still yet many other embodiments the mixed plastic waste may include unidentified, uncleaned, unsorted, compacted and homogenized plastic waste of all types, including by not limited to plastic materials in Resin Codes (RS) 1 to 7, such as, for example, polyethylene terephthalate (PET) [RS 1], high density polyethylene (HDPE) [RS 2], polyvinyl chloride (PVC) [RS 3], low density polyethylene (LDPE) [RS 4], polypropylene (PP) [RS 5], polystyrene (PS) [RS 6], and other materials [RS 7], such as for example, polycarbonate (PC), polymethyl methacrylate (PMMA), polyamide (PA), acrylonitrile-butadiene-styrene (ABS), polyoxymethylene (POM), polyetherimide (PEI), and other resins or mixtures thereof, etc.

In still yet many other embodiments the mixed plastic waste may include mixed plastic waste of both small and large volume weight including variable molecular weights and polymer chain lengths in any desired ratio or amount.

In yet still many other embodiments the total concentration of the composition and mixed plastic weight comprises no more than 70% by volume of the recycling mixture with the carrier comprising the remainder.

Various embodiments are directed to a process for tertiary recycling mixed plastic waste using a composition as described above that depolymerizes the mixed plastic waste incorporating one or more polymer macromolecules and chemically converts the mixed plastic waste into a stable and homogeneous recycled plastic material feedstock that may be incorporated into.

In various other embodiments the process s includes the following steps:

- Providing a feedstock of waste plastic comprising any suitable mixture as previously described;
- Grinding and drying the feedstock of waste plastic to a quasi-uniform size suitable for further processing;
- Determining a suitable blend of recycling additives from the list including at least a concentration of alluvium and one or more of the following based on the proposed end use of the recycled plastic material, including, but not limited to: pigments, synergists, UV protective agents, antioxidants, foaming agents, glass fiber substances and/or textile fiber substances, etc.;
- Melt blending the ground feedstock and recycling additives;
- Adding a virgin material carrier;
- Melt blending the virgin material carrier and the mixture of feedstock and recycling additives;
- Drying the combined carrier, feedstock and additive mixture; and
- Extruding the dried mixture into a suitable feedstock form.

In still various other embodiments the grinding reduces the waste plastic to a quasi-uniform size of around 0.03 to 0.4".

In yet various other embodiments the melt blending is conducted at a temperature between about 150 and 800° F., and in some such embodiments around 450° F.

In still yet various other embodiments the drying comprises holding the temperature of the mixture at around 165° F. until all ambient moisture is removed.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments and should not be construed as a complete recitation of the scope of the disclosure.

DETAILED DESCRIPTION OF THE INVENTION

Figure 1:
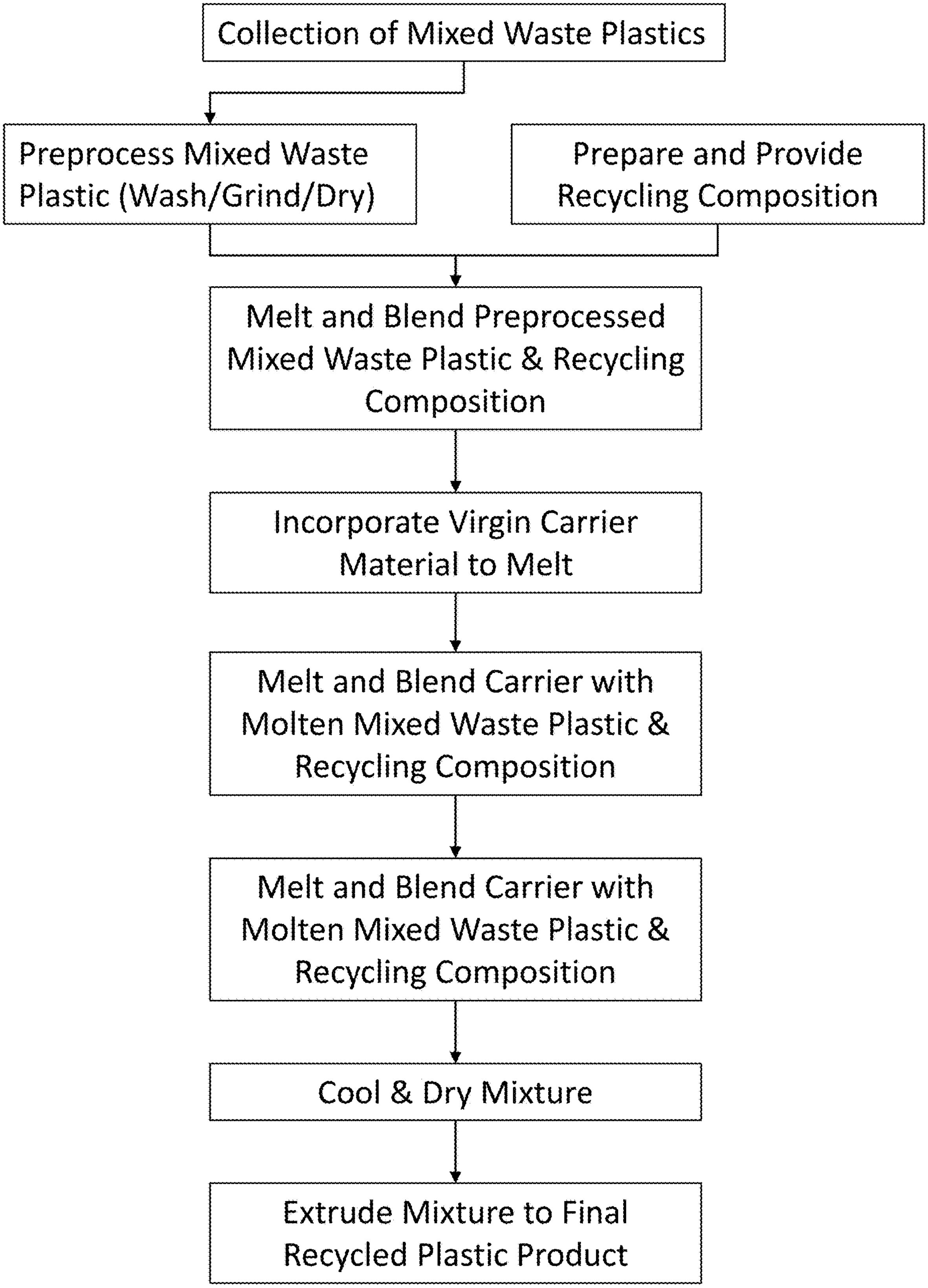
FIG. 1 presents a block diagram of a process for recycling mixed plastic waste according to embodiments.

Turning to the drawings and data, compositions and processes for the recycling of mixed plastic waste into a stable and homogeneous plastic feedstock material are provided. In many embodiments the processes and compositions allow for the recycling of unsorted, unwashed and unidentified mixed plastic waste, including waste mixtures comprising polymer macromolecules with different molecular weights and polymer chain lengths. In various embodiments, the processes include the blending of a mixed plastic waste feedstock with a recycling composition and virgin carrier comprising at least one alluvium material, such as, for example, diatomaceous earth. Embodiments using such additives enact a gluing effect that penetrates the plastic mixture and binds it together.

Embodiments of recycling compositions may include a critical concentration of alluvium (e.g., kieselguhr or other diatomaceous earth) in addition to one or more of the following additional additives: pigments (e.g., organics, inorganics, carbon black, white pigments, etc.), synergists (e.g., tri antimony oxide), UV protective agents (e.g., carbon black, hydroxybenzoates, etc.), antioxidants (e.g., phenolics, phosphites, thioesters, aminics, etc.), flame retardants (aromatic bromine, etc.), foaming agents (e.g., sodium bicarbonate, sodium chloride, etc.), glass fiber substances and/or textile fiber substances (e.g., fiberglass), among others. In many embodiments, additives may comprise aromatic bromine, tri antimony oxide, sodium bicarbonate, sodium chloride, alluvium, fiberglass and a carrier, among other materials. In some embodiments the alluvium may include, any particulate mineral material comprising one or more of sand, silt, rock, and clay. In some embodiments formulations of recycling compositions may also include organic alcohols (e.g., ethanol), wax compounds (e.g., cera alba or beeswax), grains (e.g., ground oatmeal), and other solubilizing agents such as glycerin, citric acid and/or sulfate. In some embodiments the carrier may include one or more polymer such as, for example, polyethylene, polystyrene. In various embodiments the recycling composition comprising both additives and carrier comprise no more than 70% by volume of the final mixture of plastic waste during recycling.

Embodiments of processes for the recycling of mixed plastic waste may include among other steps at least the blending of a recycling composition (including at least a critical concentration of one or more alluvium materials) with a homogenously ground mixture of plastic waste. In many such embodiments blending and mixing process comprises at least two separate blending steps including a first step in which the mechanically ground mixed plastic waste feedstock and recycling composition are heat blended to form and initial chemically modified mixed plastic waste feedstock, and a second step where the chemically modified mixed plastic feedstock is further heat blended with a suitable virgin carrier material. In various embodiments, the carrier blended material is then dried and extruded into a suitable feedstock form, such as a standard pelletized form.

Traditional polymer recycling processes (primary and secondary) are typically of a mechanical form and are suitable to handle polymeric raw materials that are accurately identified and have very clear properties characteristic to polymers of a specific type (e.g., similar to comparable virgin materials). While this method can be applied to most thermoplastic matrices (like PE, PP and PET), it cannot be used to recover thermosetting polymers (like epoxy or unsaturated polyester resins), because of their crosslinked nature. Moreover, Unfortunately, this mechanical processing relies on careful separation and processing of the plastic waste feedstock leading to an expensive, labor-intensive recycling process that leads to poor recycling rates. As an example, using traditional recycling processes a material such as PET is known to become brittle and yellow when it is blended with even a small concentration of PVC. Similarly, PE becomes brittle when it is contaminated by small amounts of PP. These contamination issues cause a strong deterioration of the technical and the economic value of these traditional recycled products. In fact, in most cases (e.g. multi-layer plastic components) the addition of recovered plastics to virgin materials will lead to a deterioration of some functional properties, like color, optical clarity or mechanical strength. (See, e.g., Dorigato, *Advanced Industrial Engineering Polymer Research,* 4 (2021) 53-69, the disclosure of which is incorporated herein by reference.) Moreover, with the increased use of polymer blends it is anticipated that this problem will only increase the inadequacy of current primary and secondary recycling processes.

Attempts have been made to address this issue by creating tertiary recycling processes capable of forming usable polymer compositions from mixed plastic waste, however, these solutions either are complex and produce materials with inferior properties not suitable for uses equivalent to those of virgin materials (see, e.g., USPN U.S. Pat. No. 6,274,637), or require carefully proportioned blends of different waste plastic, which would entail a sorting process not dissimilar to those currently required for primary and secondary recycling processes (see, e.g., U.S. Pat. No. 10,301,448). The present disclosure provides compositions and processes that allow for the production of a recycled plastic feedstock material that may be used in combination with a vast variety of virgin plastic materials of different polymer materials, from mixtures of not accurately identified waste polymer materials without the need for complex reprocessing or sorting.

The recycled polymer composition formed in accordance with embodiments of the present disclosure can be used as raw material in concentrations up to 12% by volume in combination with any suitable plastic feedstock for manufacturing various plastic products. Unlike prior art solutions, according to embodiments of the present disclosure the polymer material waste is not separated by types, including by molecular weight or polymer chain length. Moreover, the recycled polymer composition of embodiments of the present disclosure may be used in any consumer product without limitation to intended use unlike many recycled feedstocks which are proposed for use in a set of limited use cases (see, e.g., U.S. Pat. No. 10,301,448).

Turning now to FIG. 1, according to many embodiments, the plastic recycling process comprises at least the following steps:

- Providing a volume of mixed plastic waste;
- Processing the mixed plastic waste to form a mixed dried waste feedstock having an approximately uniform size;
- Heat blending the processed mixed waste feedstock with a plastic recycling composition comprising at least one alluvium material (e.g., mixed minerals, diatomaceous earths, etc.) and one or more additives selected from: solvents (e.g., ethanol), wax, (e.g., cera alba or beeswax), pigments (e.g., organics, inorganics, carbon black, white pigments, etc.), synergists (e.g., tri antimony oxide, sulfates, etc.), UV protective agents (e.g., carbon black, hydroxybenzoates, etc.), antioxidants (e.g., phenolics, phosphites, thioesters, aminics, citric acid, etc.), flame retardants (aromatic bromine, etc.), foaming agents (e.g., sodium bicarbonate, sodium chloride, glycerin, etc.), glass fiber substances and/or textile fiber substances (e.g., fiberglass or grains such as ground oatmeal), among other additives suitable for plastic reprocessing;
- Adding and heat blending a suitable carrier (e.g., PP, LDPE, ABS, PEI, POM, etc. and mixtures thereof) into the mixture of feedstock and plastic recycling composition to form a molten recycled plastic feedstock material; and
- Drying and extruding the molten recycled plastic feedstock material to form a recycled plastic feedstock material of a suitable form.

As described above, in many embodiments the plastic waste is of a mixed nature. Conventional plastic waste recycling processes typically require that the plastic waste be collected and sorted separately by specific polymer types based on a standardized resin code (as provided in TABLE 1, below). According to embodiments of the current disclosure recycling processes allow for the mixing of different polymer types regardless of molecular weight or polymer chain length of the different plastic weight materials. Specifically, according to embodiments the plastic waste is separated roughly using standard procedures to remove non-plastic materials, such as, for example, glass, metal, textiles, paper, etc. The mixed plastic waste is then formed into a homogeneous polymer mixture mechanically compacting and granulating the mixture. This granulated mixed plastic waste is then directly processed according to embodiments without reference to polymer type, molecular weight (e.g. volume weight) or polymer chain length. For example, a typical waste stream generate by construction and demolition waste may include a mixture of nearly a dozen different plastic materials, including, for example, ABS, PA, PC, PE, PET, PMMA, PPPS, and PVC, among others. (See, e.g., Lathela, et al., *Polymers,* 11 (2019) 69-76, the disclosure of which is incorporated herein by reference.) According to embodiments, a typical waste stream of this type may be processed without any further sorting, including sorting by polymer type, volume weight, molecular weight or polymer chain length. Accordingly, the ultimate polymer composition formed in accordance with embodiments from the mixed plastic waste comprises a homogeneous mixture recycled from unsorted, unidentified, uncleaned plastic waste of different densities, various colors, small volume weight and/or large volume weight without regard to the proportion of the various substituent plastic materials.

TABLE 1

PLASTIC WASTE MATERIAL TYPES

| Resin Code | Polymer Resin | General Applications |
|---|---|---|
| 1 | PT | Drinking bottles, food containers |
| 2 | HDPE | Soap and shampoo containers, shipping containers |
| 3 | PC | Packing materials, pipes, fencing |
| 4 | LDPE | Dry cleaning bags, shrink wrap, plastic film |
| 5 | PP | Bottle caps, automotive parts, carpeting |
| 6 | PS | Disposable cups/utensils, foam packaging, food containers |
| 7 | Other | Reusable water bottles, packaging |

The process for preprocessing, mixing and granulating the mixed plastic waste may take any suitable form. In many embodiments during the initial preprocessing the mixed plastic waste is first separated from any non-plastic materials and then broken-up, granulated and mixed during using mechanical means. In various such embodiments a bladed machine breaks-up, grinds and compacts the mixed plastic waste into an agglomeration of approximately uniform plastic fragments. Although not essential to the process, in certain embodiments these fragments may be further washed and dried to remove residual non-plastic materials, contaminants and moisture. In various embodiments, the mixed plastic fragments have a fraction size of approximately 0.03 to 0.4 inches (e.g., 0.3 inches), and be dry of any ambient moisture (i.e., a moisture content below 1%), suitable for the subsequent production process.

Once the compacting and granulation process is completed, according to various embodiments, the entire agglomeration is heat blended until a molten plastic mixture is obtained. This heat blending process serves two purposes, first it melts the plastic fragments into a uniform molten mass and also removes residual organic or inorganic contaminants that may be present after the preceding preprocessing steps. During the heat blending process the plastics may be continuously stirred or agitated to ensure the molten material is completely mixed into a homogenous molten plastic waste mixture.

Into the molten plastic waste mixture is added a recycling composition according to embodiments. The recycling composition is mixed into the molten plastic waste mixture and the new mixture comprising the plastic waste and recycling composition is further melt blended and agitated or stirred until a homogenous recycling mixture is obtained. Once the homogenous recycling mixture is obtained a further carrier material is added to the molten material and the new combination is melt blended with agitation or stirring to obtain a molten homogenous recycled plastic mixture. Throughout the multi-step heat blending process the temperature of the molten mixture according to many embodiments is maintained in a range between about 150° F. and 800° F.

Turning to the compositions of the materials added to the mixed plastic waste in the above steps, in many embodiments the recycling composition at least comprises a concentration of an alluvium material. In cases where the recycling composition will be extruded in advance a carrier comprising a suitable plastic material feedstock is also included. In many embodiments the alluvium material may include silt, sand, clay, diatomaceous earth, kieselguhr, or other mineral containing materials. In various embodiments the total concentration of alluvium material in the final overall composition is from 1 to 5% by volume. The combination of the alluvium material (e.g., mixed minerals, diatomaceous earths, etc.) in the recycling composition to the molten mixed plastic waste serves to ensure that the various plastic materials decompose and chemically convert without the deleterious chemical interactions observed in conventional techniques. The recycling composition may also comprise other suitable additives selected to ensure the final recycled plastic material has properties appropriate for the desired use. Exemplary additive materials include, pigments (e.g., organics, inorganics, carbon black, white pigments, etc.), synergists (e.g., tri-antimony oxide, sulfates, etc.), UV protective agents (e.g., carbon black, hydroxybenzoates, etc.), antioxidants (e.g., phenolics, phosphites, thioesters, aminics, citric acid, etc.), flame retardants (aromatic bromine, etc.), foaming agents (e.g., sodium bicarbonate, sodium chloride, glycerin, etc.), natural fiber substances, glass fiber substances and/or textile fiber substances (e.g., fiberglass or grains such as oatmeal), solvents (e.g., ethanol, etc.) waxes (e.g., cera alba or beeswax) among other additives suitable for plastic reprocessing. In some embodiments, the recycling composition may comprise a composition as set forth in TABLE 2, below. Regardless of the specific components of the recycling composition the combined concentration of the mixed waste plastic and recycling composition comprises up to 70% by volume of the final recycled plastic material.

TABLE 2

EXEMPLARY RECYCLING COMPOSITIONS

| Additive Type | Additive Material | Concentration (% vol) |
|---|---|---|
| Formulation 1 | | |
| Synergist | Tri-antimony oxide | (0.5-18%) |
| Foaming Agent | Sodium bicarbonate | (0.25-12%) |
| | Sodium chloride | (0.25-12%) |
| Fiber material | Fiberglass | (2-18%) |
| Alluvium | Mixed mineral material | (1-15%) |
| Flame Retardant | Aromatic bromine | (2-25%) |
| Polymeric carrier | polyethylene | balance (as necessary) |
| Formulation 2 | | |
| Synergist | Sulfates | (0.5-11%) |
| Foaming Agent | Glycerin | (0.5-9%) |
| | Cera alba | (0.25-7%) |
| Fiber material | Ground oatmeal | (10%-25%) |
| Alluvium | Diatomaceous earth | (13-36%) |
| Solvent | Ethanol | (12-25%) |
| Antioxidants | Citric Acid | (0.5-9%) |
| Polymeric carrier | polyethylene | balance (as necessary) |

In turn the carrier material is chosen such that the mixed plastic waste materials, as modified by the recycling composition, may bind into a homogeneous final recycled plastic material. In various embodiments the carrier material is chosen from the group comprising, PE, PS, PP, PET, ABS and PEI, or mixtures thereof depending on the desired end use of the recycled plastic material. To ensure appropriate blending and binding of the constituent elements of the mixture, and homogeneous properties of the final recycled plastic material, in many embodiments the carrier concentration comprises up to 31% by volume of the final recycled plastic material.

The molten recycled plastic material is then cooled, dried, and extruded into a suitable form for use in future products. In many such embodiments, the extruded final product comprises a standard pellet form as may comprise a suitable feedstock in any conventional industrial plastic application.

Embodiments are also directed to recycled plastic materials that may be subsequently recycled indefinitely. Results from exemplary materials have shown that the finale recycled plastic should comprise a sufficient quantity of carrier polymers of similar properties and similar molecular formulas, and a sufficient quantity of the recycling composition. According to various embodiments these are PS, PE, PP, PET ABS, and PEI, with the preferred content in the composition being at least 20% by volume and up to 31% by volume. Similarly, the alluvium and other additives are included as substances controlling the subsequent production process as appropriate, i.e. the behavior of the molten plastic mixture is controlled through them in the course of recycling the composition. In particular, a minimum concentration of alluvium materials of 1% by volume of the total mixture is required to ensure homogeneous binding and blending of the carrier materials and the mixed plastic waste in successive cycles of recycling. Further, studies have shown that the recycled plastic material according to embodiments may be included as an additive to any arbitrary raw plastic material in a concentration of from about 4 to 12% without negatively impacting the final properties of the overall plastic material thus allowing for its use in a wide variety of structural and decorative applications.

EXEMPLARY EMBODIMENTS

The following embodiments present data and test results obtained from the result of using specific embodiments of the instant disclosure. These embodiments are only presented as examples and are not intended to be comprehensive or to limit the scope of the disclosure.

Figure 2A:
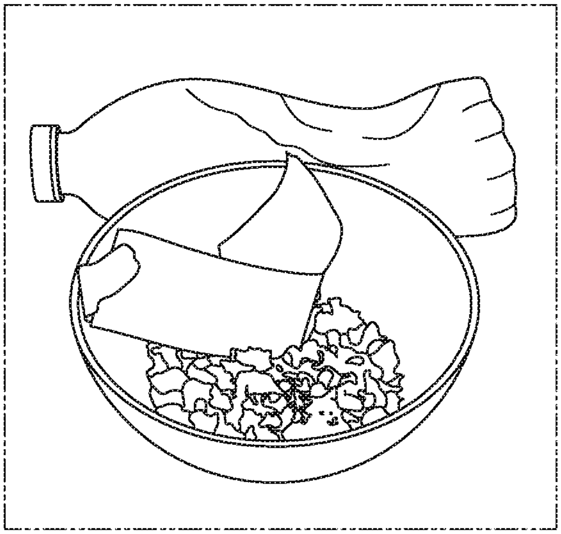
FIGS. 2A to 2C present image of a recycled plastic material formed according to embodiments.
Figure 2B:
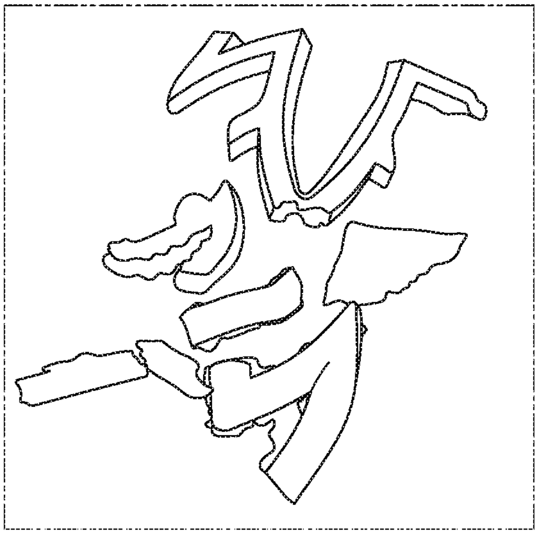
Figure 2C:
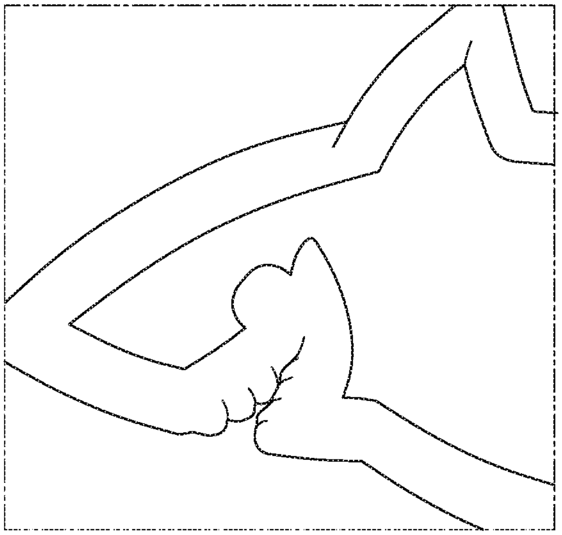

An exemplary polymer composition according to embodiments and a comparison against a sample formed using conventional processes is presented in FIGS. 2A to 2C. These exemplary polymer compositions were formed from compacted and homogenized mixed plastic waste and includes plastic waste of different types obtained from recycled unidentified, uncleaned, unsorted plastic waste. In the specific example, the mixed plastic waste included at least the following:

The test specimen was obtained according to embodiments using the following procedure:

A mixture of unsorted mixed plastic waste, including labels and other foreign material was ground into a homogenized mixed plastic waste having a quasi-uniform size of around 0.3 inches, as shown in FIG. 2A. No attempt was made to select the types or relative concentrations of plastics used in the mixed plastic waste.

The ground homogenized mixed waste plastic was then cleaned and dried to remove ambient moisture such that the overall moisture content of the mixed plastic waste was less around or less than 1%.

The mixed plastic waste was then melt blended at a temperature of around 450° F., and for the sample shown in FIG. 2B the mixed material was then cooled, dried and extruded into desired shapes.

For the sample shown in FIG. 2C, an additive comprising (all percentages by volume) aromatic bromine 2-8%, tri antimony oxide 0.5-6%, sodium bicarbonate 0.25-4%, sodium chloride 0.25-4%, alluvium 1-5%, fiberglass 2-6% was added to the melt blended plastic waste and the mixture further melt blended to obtain an additive treated homogenous material. To this material mixture was then further added a polyethylene/polystyrene carrier of no more than 31% by volume. This carrier included mixture was then melt blended to obtain a final recycled plastic material, which was then cooled, dried and extruded into the desired shape shown in FIG. 2C.

FIG. 2C presents an image of the final recycled polymer composition formed in accordance with embodiments. This is compared with extruded recycled polymer materials formed without the additive according to embodiments, which shows breakage and delamination as shown in FIG. 2B. The differences between the polymer composition of the present invention, and the material formed according to conventional processes are clear, with the current material being indistinguishable from an item formed with virgin plastic material and the conventional formulation showing breakage and delamination common to they types of results seen from attempts to recycle contaminated plastic feedstocks using conventional processes.

A similar experiment under the same conditions was conducted using a recycling composition of Formulation 2 in Table 2 with the following composition (all percentages by volume) kieselguhr (Diatomaceous Earth) 17%. ethanol 14%, cera alba (Beeswax) 2%, grains (ground Oatmeal) 12%, glycerin 3%, citric Acid 2% with a balance of polyethylene feedstock. Similar results were obtained with this formulation, namely that mixed plastics (a 50/50 blend of PE/PP) without the recycling composition became brittle and unusable, while the mixed plastics recycled using the recycling composition appeared indistinguishable from virgin plastic material.

DOCTRINE OF EQUIVALENTS

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method for recycling mixed plastic waste comprising:

providing a feedstock of mixed plastic waste;

grinding and drying the feedstock of mixed plastic waste to a quasi-uniform size;

forming a recycling mixture of the feedstock of mixed plastic waste of different types and a recycling composition comprising an effective amount of each of the followings: ethanol, cera alba, grains, glycerin, citric acid, sulfate and diatomaceous earth, and one or more additive materials selected from the list consisting of: solvents, pigments, synergists, UV protective agents, antioxidants, foaming agents, and fiber substances;

melt blending the ground feedstock of mixed plastic waste and the recycling composition;

adding a carrier to the melt blended mixture of ground feedstock of plastic waste and recycling composition;

melt blending the carrier and the mixture of ground feedstock of plastic waste and recycling composition;

drying the combined carrier, the feedstock of plastic waste and the recycling composition; and extruding the dried mixture into a suitable recycled plastic feedstock form.

2. The method of claim 1, wherein the grinding reduces the feedstock to a quasi-uniform size of around 0.03 to 0.4".

3. The method of claim 1, wherein the melt blending is conducted at a temperature between about 150 and 800° F.

4. The method of claim 1, wherein the drying comprises holding the temperature of the combined carrier, the feedstock and the recycling composition at around 165° F. until substantially all ambient moisture is removed.

5. The method of claim 1, wherein the feedstock comprises unidentified, uncleaned, unsorted, compacted and homogenized plastic waste of any type both small and large volume weight including variable molecular weights and polymer chain lengths in any desired ratio or amount.

6. The method of claim 5, wherein the feedstock comprises one or more classes of plastic material selected from Resin Codes (RS) 1 to 7.

7. The method of claim 6, wherein the feedstock comprises one or more plastic materials selected from the group of polyethylene terephthalate (PET), high density polyethylene (HDPE), polyvinyl chloride (PVC), low density polyethylene (LDPE), polypropylene (PP), polystyrene (PS), polycarbonate (PC), polymethyl methacrylate (PMMA), polyamide (PA), acrylonitrile-butadiene-styrene (ABS), polyoxymethylene (POM), polyetherimide (PEI), and other resins or mixtures thereof.

8. The method of claim 1, wherein the total concentration of the recycling composition and feedstock comprises no more than 70% by volume of the recycling mixture with the carrier comprising the remainder.

9. The method of claim 1, wherein the recycling composition comprises an effective amount of each of the following: aromatic bromine, antimony oxide, sodium bicarbonate, sodium chloride, alluvium, and fiberglass.

10. The method of claim 9, wherein the aromatic bromine has a concentration of 2-25% by volume, the tri antimony oxide has a concentration of 0.5-18% by volume, the sodium bicarbonate has a concentration of 0.25-12% by volume, the sodium chloride has a concentration of 0.25-12% by volume, the alluvium has a concentration of 1-15% by volume, and the fiberglass has a concentration of 2-18% by volume.

11. The method of claim 1, wherein the ethanol has a concentration of 12-25% by weight, the sulfate has a concentration of 0.5-11% by volume, the glycerin has a concentration of 0.5-9% by volume, the cera alba has a concentration of 0.25-7% by volume, the diatomaceous earth has a concentration of 13-36% by volume, the grains have a concentration of 10-25% by volume, and the citric acid has a concentration of 0.5-9% by volume.

12. The method of claim 1, wherein the carrier comprises one or more polymer materials selected from the group consisting of: low density polyethylene, polystyrene, polypropylene, polyethylene terephthalate, acrylonitrile-butadiene-styrene, and polyetherimide.

* * * * *